US009640203B1

(12) United States Patent
Buch et al.

(10) Patent No.: US 9,640,203 B1
(45) Date of Patent: May 2, 2017

(54) MULTI-FREQUENCY MICROWAVE ASSISTED MAGNETIC RECORDING APPARATUS AND METHOD

(71) Applicant: Seagate Technology LLC, Cupertino, CA (US)

(72) Inventors: Bruce Douglas Buch, Westborough, MA (US); Kim Yang Lee, Fremont, CA (US); Ning Li, Chanhassen, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/051,083

(22) Filed: Feb. 23, 2016

(51) Int. Cl.
G11B 5/09 (2006.01)
G11B 5/39 (2006.01)
G11B 5/00 (2006.01)

(52) U.S. Cl.
CPC .... *G11B 5/3909* (2013.01); *G11B 2005/0024* (2013.01)

(58) Field of Classification Search
None
See application file for complete search history.

(56) References Cited

U.S. PATENT DOCUMENTS

| 5,741,345 | A | 4/1998 | Grabarse et al. |
|---|---|---|---|
| 7,616,412 | B2 | 11/2009 | Zhu et al. |
| 7,724,469 | B2 | 5/2010 | Gao et al. |
| 8,107,352 | B1 | 1/2012 | Yamanaka et al. |
| 8,228,632 | B2 | 7/2012 | Gubbins et al. |
| 8,481,181 | B2 | 7/2013 | Wang et al. |
| 8,553,507 | B1 | 10/2013 | Tagawa et al. |
| 8,582,225 | B2 | 11/2013 | Shiimoto et al. |
| 8,611,045 | B2 | 12/2013 | Kaizu et al. |
| 8,693,142 | B2 | 4/2014 | Chen et al. |
| 8,964,332 | B1 | 2/2015 | Katada et al. |
| 9,064,508 | B1 | 6/2015 | Shiimoto et al. |
| 9,142,227 | B1 | 9/2015 | Etoh et al. |
| 2003/0058558 | A1* | 3/2003 | Ottesen ............. G11B 5/59627 360/31 |
| 2008/0151436 | A1* | 6/2008 | Sato ....................... B82Y 10/00 360/313 |
| 2009/0262457 | A1 | 10/2009 | Rivkin et al. |
| 2010/0171494 | A1* | 7/2010 | Yanagisawa ........... B82Y 25/00 324/252 |
| 2010/0309577 | A1 | 12/2010 | Gao et al. |
| 2011/0216435 | A1 | 9/2011 | Shiimoto et al. |
| 2011/0248710 | A1* | 10/2011 | Sato ..................... G01R 33/098 324/250 |
| 2012/0068281 | A1* | 3/2012 | Saida .................... G11C 11/161 257/421 |

(Continued)

*Primary Examiner* — Peter Vincent Agustin
(74) *Attorney, Agent, or Firm* — Hollingsworth Davis, LLC

(57) ABSTRACT

An apparatus comprises a recording transducer configured for microwave-assisted magnetic recording (MAMR) and a magnetic recording medium. The recording transducer comprises a write pole configured to generate a write magnetic field and a write-assist arrangement proximate the write pole. The write-assist arrangement is configured to generate a radio frequency assist magnetic field at a plurality of different frequencies. The magnetic recording medium comprises a plurality of tracks, wherein adjacent tracks of the medium have different ferromagnetic resonant frequencies.

22 Claims, 8 Drawing Sheets

(56) References Cited

U.S. PATENT DOCUMENTS

| | | | |
|---|---|---|---|
| 2012/0075752 A1* | 3/2012 | Sato | G01R 33/098 360/324 |
| 2012/0127610 A1* | 5/2012 | Aoyama | G11B 5/3133 360/123.05 |
| 2012/0224283 A1* | 9/2012 | Sato | G11B 5/3133 360/324.11 |
| 2012/0230167 A1 | 9/2012 | Aoyama et al. | |
| 2013/0028058 A1* | 1/2013 | Yasui | G11B 5/1278 369/13.14 |
| 2013/0163111 A1 | 6/2013 | Albrecht et al. | |
| 2013/0258527 A1 | 10/2013 | Soeno et al. | |
| 2013/0286505 A1 | 10/2013 | Fukuda et al. | |
| 2013/0293983 A1* | 11/2013 | Hirayama | G11B 5/718 360/71 |
| 2013/0301162 A1 | 11/2013 | Sato et al. | |
| 2015/0062745 A1 | 3/2015 | Hinoue et al. | |

* cited by examiner

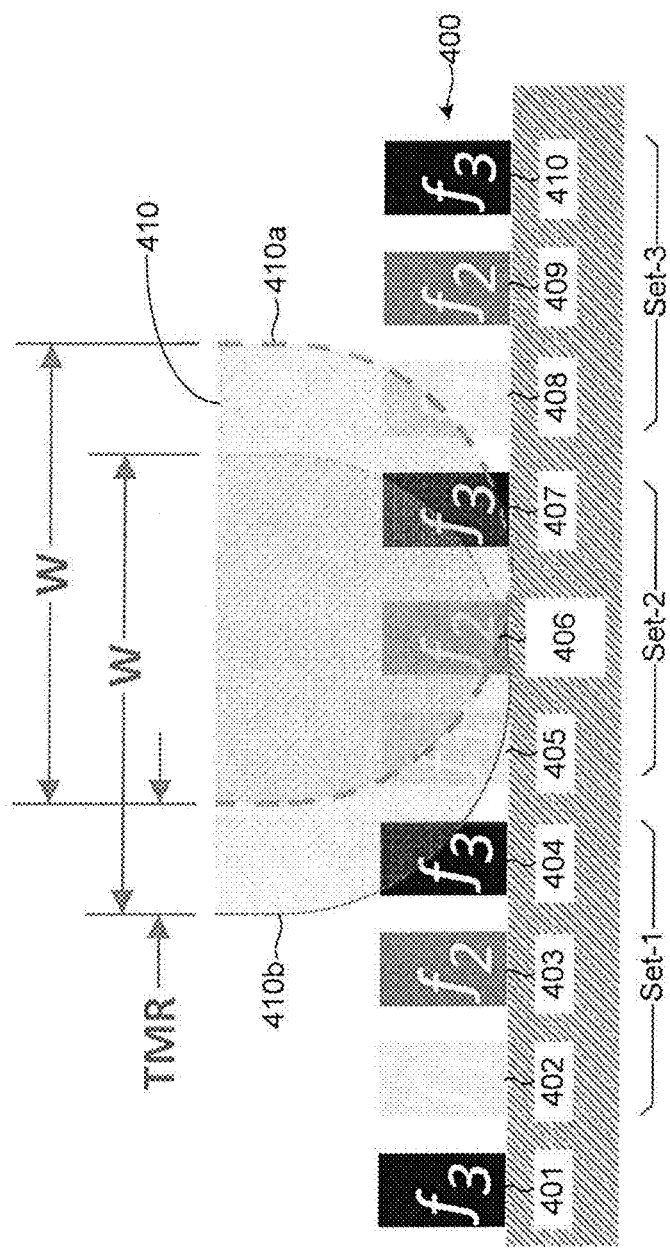

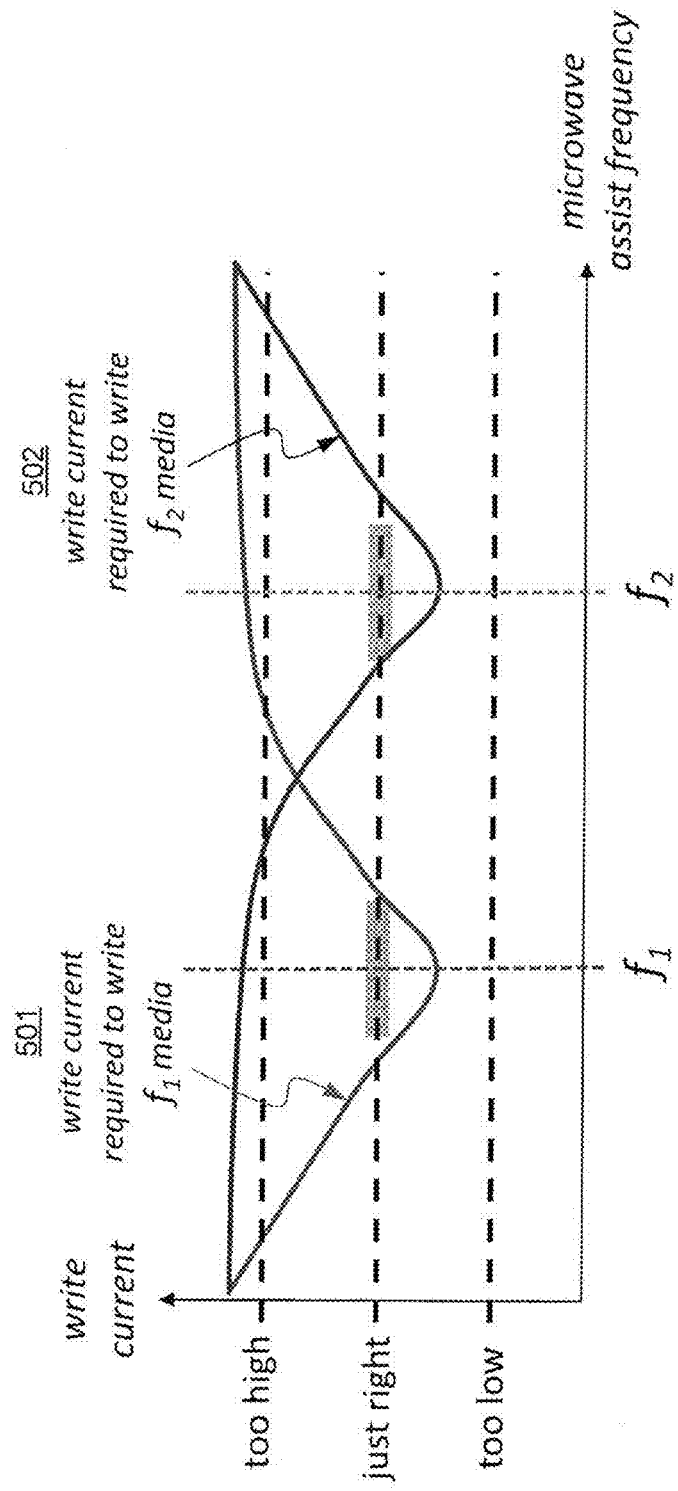

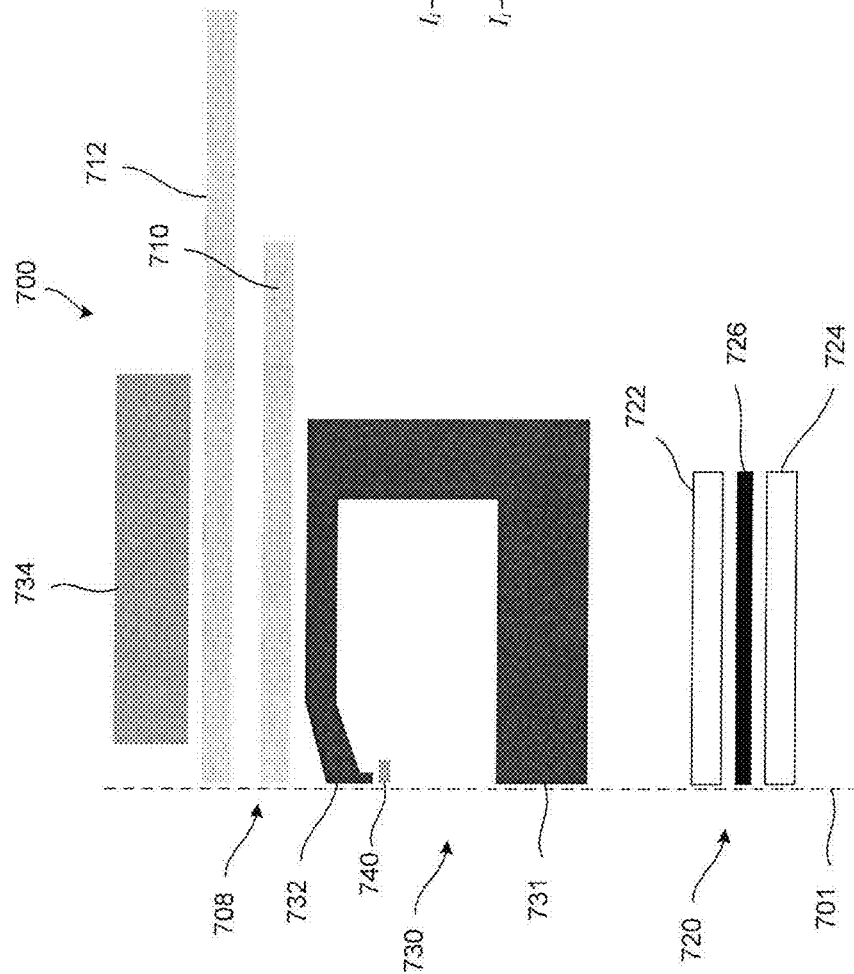

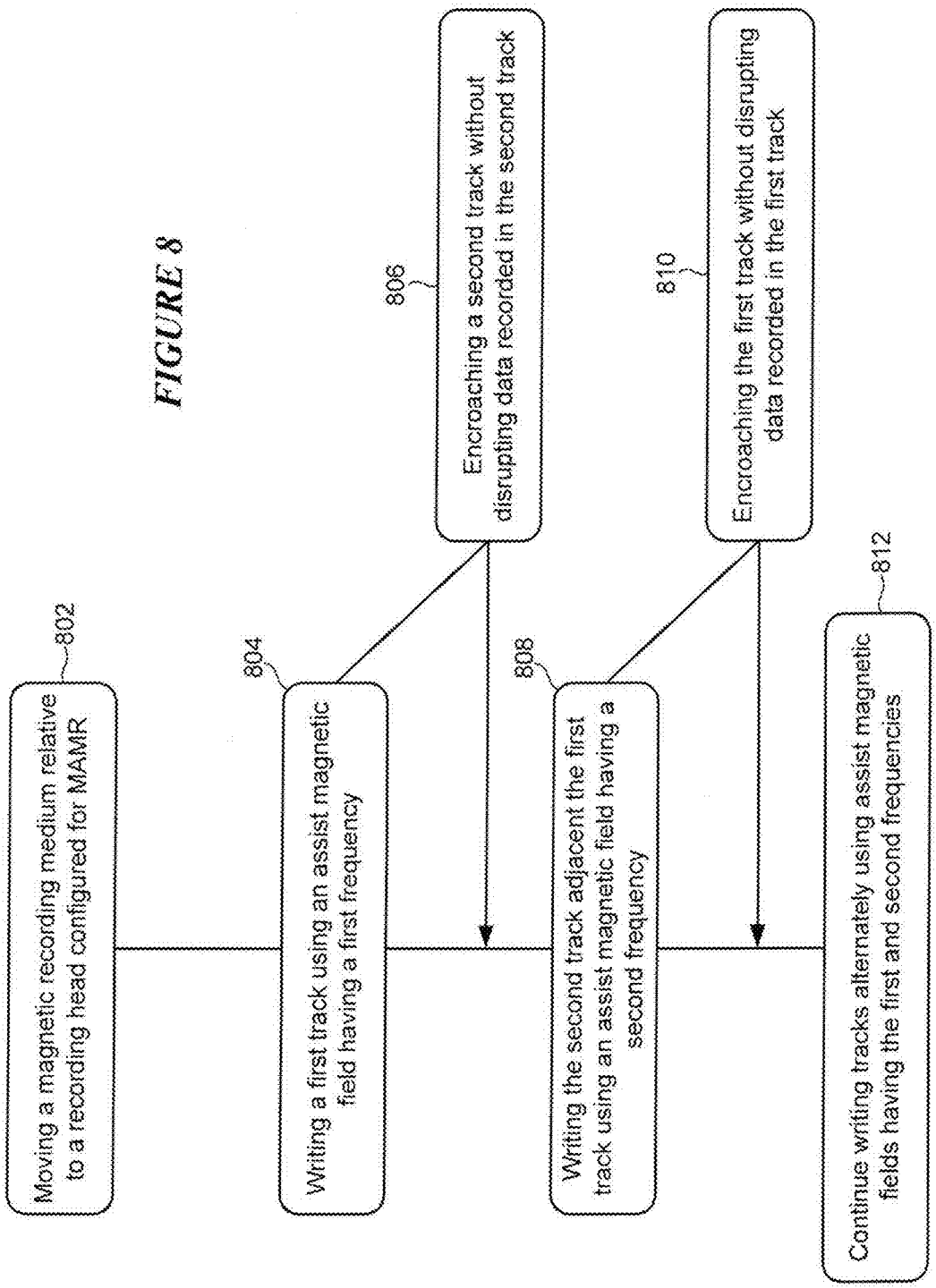

MULTI-FREQUENCY MICROWAVE ASSISTED MAGNETIC RECORDING APPARATUS AND METHOD

SUMMARY

Various embodiments are directed to an apparatus comprising a recording transducer configured for microwave-assisted magnetic recording (MAMR) and a magnetic recording medium. The recording transducer comprises a write pole configured to generate a write magnetic field and a write-assist arrangement proximate the write pole. The write-assist arrangement is configured to generate a radio frequency assist magnetic field at a plurality of different frequencies. The magnetic recording medium comprises a plurality of tracks, wherein adjacent tracks of the medium have different ferromagnetic resonant frequencies.

Some embodiments are directed to an apparatus comprising a recording transducer configured for microwave-assisted magnetic recording. The recording transducer comprises a write pole configured to generate a write magnetic field and a write-assist arrangement proximate the write pole. The write-assist arrangement is configured to generate a radio frequency assist magnetic field at a plurality of different frequencies.

Other embodiments are directed to an apparatus comprising a magnetic recording medium configured for microwave-assisted magnetic recording. The medium comprises a plurality of tracks, wherein adjacent tracks of the medium have differing ferromagnetic resonant frequencies.

Further embodiments are directed to a method comprising moving a recording transducer configured for microwave-assisted magnetic recording relative to a magnetic recording medium comprising a plurality of tracks, wherein adjacent tracks of the medium have differing ferromagnetic resonant frequencies. The method involves generating a radio frequency write-assist field having one of a plurality of different frequencies, selecting a particular frequency that corresponds to a ferromagnetic resonant frequency of a particular track of the medium, and generating a write field to write information to the particular track assisted by the write-assist field.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIG. 4 is a view of a magnetic recording medium looking in the plane of the medium across ten discrete tracks, wherein adjacent tracks have different ferromagnetic resonant frequencies according to various embodiments;

FIG. 5 is graph showing the write current required to effect writing to magnetic media having two different ferromagnetic resonant frequencies in accordance with various embodiments;

FIG. 7A shows a recording head arrangement configured to generate a high frequency write-assist field having a plurality of different frequencies in accordance with various embodiments;

FIG. 7B shows a write-assist arrangement configured to generate write-assist magnetic fields having a plurality of different frequencies in accordance with some embodiments;

FIG. 7C shows a write-assist arrangement configured to generate write-assist magnetic fields having a plurality of different frequencies in accordance with some embodiments; and FIG. 8 illustrates various processes for generating write-assisted magnetic fields having a plurality of different frequencies in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
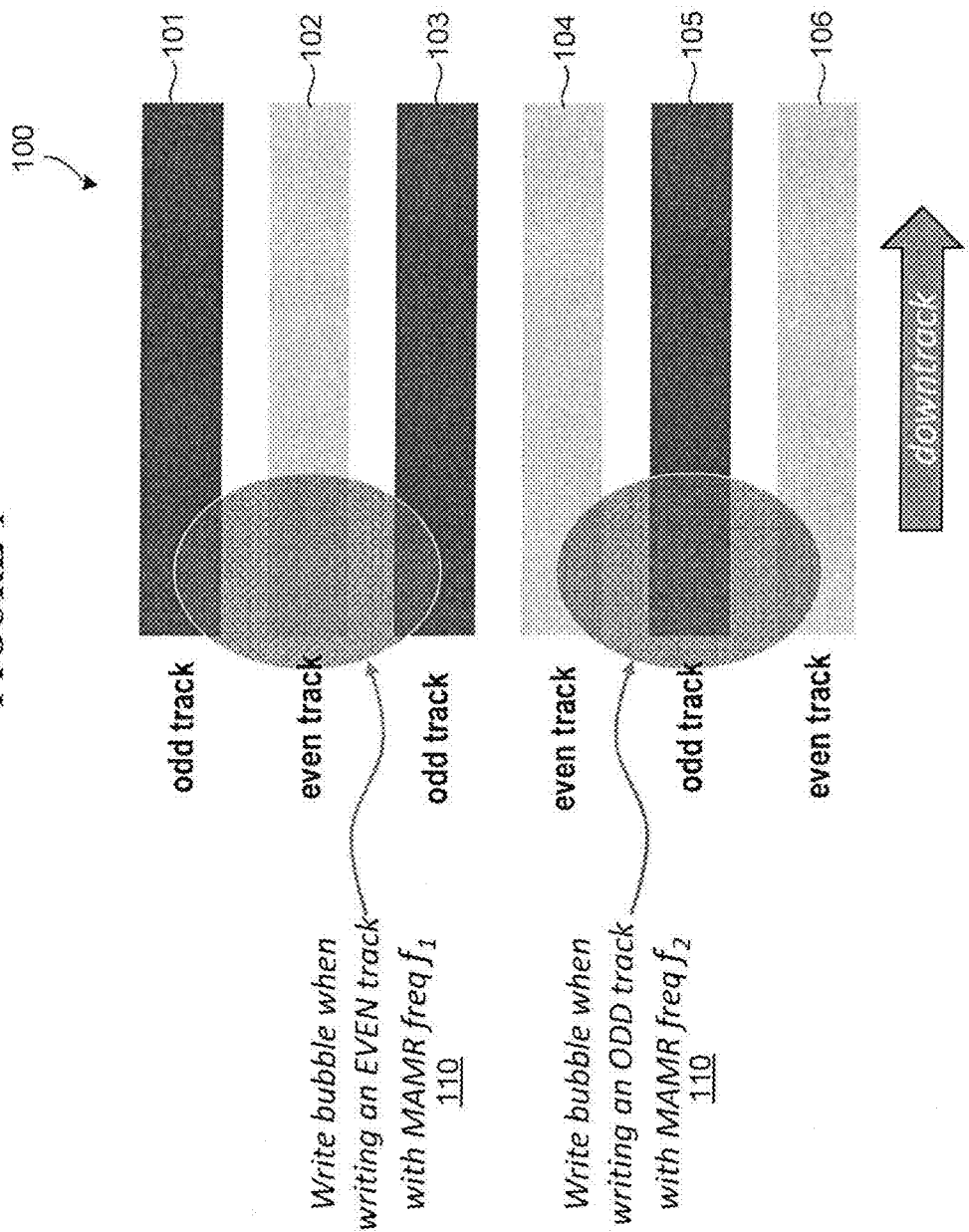
FIG. 1 shows discrete tracks of a magnetic recording medium that are formed from magnetic material having a plurality of different ferromagnetic resonant frequencies in accordance with various embodiments.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Increasing the density of magnetic media generally involves increases in both downtrack density (BPI) and cross-track density (TPI). Most of the emerging technologies for increasing areal density also trend towards lowering bit aspect ratio, which in turn pushes track density requirements harder than bit density. Array readers offer a path to reading narrow tracks, but the challenge of writing at extremely high track density creates substantial challenges for practical drive operation.

For example, it will be exceedingly difficult to keep servo track misregistration (TMR) below the threshold required for viable operation at these decreasing track pitches. If TMR cannot scale, the operation of such high density drives will be plagued by the impairments of off-track writing and adjacent track overwrite. By way of further example, as track pitch decreases, the write bubble width needs to decrease proportionally, while maintaining enough strength to write stable media, requiring significantly increased field gradients to prevent adjacent track overwriting. The write bubble is the area of the recording medium magnetized by the write pole of the recording head. Shingling (e.g., shingled magnetic recording) provides some relaxation of write bubble width, but still requires sharp gradients on at least one side, and results in writing with a skewed curvature.

Embodiments of the disclosure are directed to magnetic recording systems that employ high-frequency assisted writing using a spin-torque oscillator (STO). This type of recording, often referred to a microwave-assisted magnetic recording (MAMR), applies a high frequency oscillatory assist magnetic field from the STO to the magnetic grains of the recording layer during a write operation. The assist field has a frequency the same as or close to the resonant frequency of the magnetic grains in the recording layer to facilitate the switching of the magnetization of the grains at lower write fields from the conventional write head than would otherwise be possible without assisted recording. MAMR provides for an increase in the coercivity of the magnetic recording layer above that which could be written to by using conventional perpendicular magnetic recording alone. The increase in coercivity afforded by MAMR allows for a reduction in the size of the magnetic grains and thus a corresponding increase in recording density of the recording medium.

Embodiments are directed to MAMR apparatuses and methods that involve a plurality of different MAMR frequencies. Some embodiments are directed to magnetic recording media having adjacent tracks formed from magnetic material having different ferromagnetic resonant frequencies. Other embodiments are directed to magnetic recording heads having a write-assist arrangement configured to generate a radio frequency (RF) assist magnetic field at a plurality of different frequencies. In some embodiments, the write-assist arrangement comprises a single STO configured to generate write-assist magnetic fields at a plurality of different frequencies. In other embodiments, the write-assist arrangement comprises a multiplicity of STOs, each configured to generate a write-assist magnetic field at one of a plurality of different frequencies. Further embodiments combine magnetic recording media having adjacent tracks formed from magnetic material having different ferromagnetic resonant frequencies with magnetic recording heads having a write-assist arrangement configured to generate radio frequency assist magnetic fields at a plurality of different frequencies.

According to various embodiments, magnetic recording media is patterned with an interleave of tracks having different MAMR resonant frequencies which can alleviate both the TMR and write bubble width challenges associated with high-density media. As was discussed previously, MAMR uses a RF field to assist a writer's magnetic field in switching a bit by coaxing the magnetic moments of a bit to process at a resonant frequency particular to the anisotropy of the media. In the disclosed media, each track has enough MAMR resonant frequency contrast with adjacent tracks so that microwave-assisted writing of a target track does not affect adjacent tracks, even if the write bubble overlaps those adjacent tracks. Recording heads configured for such media can be fabricated with the ability to emit RF at discrete frequencies matching the resonant frequencies of the media's tracks. A single one of these frequencies would be emitted when writing a track, said frequency matching the resonant frequency of the track to be written. For example, if even tracks had a resonant frequency of $f_1$ and odd tracks had a resonant frequency of $f_2$, one of two STO's (spin torque oscillators) of the writer operating at frequencies of $f_1$ and $f_2$ would be energized as per the track to be written. Alternatively, a single STO tunable from $f_1$ to $f_2$ can be used to emit one frequency or the other. It is noted that more than two disparate MAMR frequencies can be used (e.g., $f_1$, $f_2$, and $f_3$) in the fabrication of media and recording heads.

Using tracks that are only writeable when assisted by RF emission at a resonant frequency different than that of neighboring tracks provides a number of advantages. It relaxes the requirements on the write bubble size and field gradients since the write bubble can extend into adjacent tracks without causing adjacent track overwrite. Similarly, because of the resonant frequency contrast, the RF assist magnetic field need not be contained to the bounds of a single track. Also, the TMR that results in the write bubble further encroaching into adjacent tracks would not result in destruction of adjacent track information. Lastly, allowing a write bubble that extends into adjacent tracks would result in less write field curvature on the track being written. The disclosed approaches relax the TMR and write field requirements for high-density media, while retaining the attributes of conventional 2-level recording and detection.

Turning now to FIG. 1, there is shown a number of discrete tracks 100 of a magnetic recording medium that are formed from magnetic material having a plurality of different ferromagnetic resonant frequencies in accordance with various embodiments. In particular, the tracks 100 are formed from magnetic material having a plurality of different MAMR resonant frequencies. In the embodiment shown in FIG. 1, six discrete tracks 100 of the medium are identified as odd tracks 101, 103, and 105 and even tracks 102, 104, and 106. The odd tracks 101, 103, and 105 are formed from magnetic material having a first MAMR resonant frequency, $f_2$. The even tracks 102, 104, and 106 are formed from magnetic material having a second MAMR resonant frequency, $f_1$. The first MAMR resonant frequency $f_2$ is different from the second MAMR resonant frequency $f_1$. As such, in the embodiment shown in FIG. 1, the tracks 100 alternate between having MAMR resonant frequencies of $f_2$ and When recording data to the discrete tracks 100, the even tracks 102, 104, and 106 are written to with MAMR frequency $f_1$, and the odd tracks 101, 103, and 105 are written to with MAMR frequency $f_2$. As will be described hereinbelow, the medium can incorporate tracks 100 that are formed from magnetic material having more than two different ferromagnetic resonant frequencies, such as three different resonant frequencies $f_1$, $f_2$, and $f_3$. In such embodiments, each track having a particular ferromagnetic resonant frequency will be written using a write-assist field having the same or about the same frequency as the track's particular ferromagnetic resonant frequency.

The upper portion of FIG. 1 illustrates microwave-assisted magnetic recording of even tracks of a medium comprising discrete (continuous) tracks having alternating MAMR resonant frequencies $f_1$ and $f_2$. The lower portion of FIG. 1 illustrates microwave-assisted magnetic recording of odd tracks of the medium comprising tracks having alternating MAMR resonant frequencies $f_1$ and $f_2$. In the upper portion of FIG. 1, a write bubble 110 is shown centered along even track 102. The write bubble 110 represents the area of the medium that is magnetized by the write pole of the recording head during a write operation for a targeted track. As can be seen in FIG. 1, the write bubble 110 centered on even track 102 extends beyond the width of track 102 in a cross-track direction. More particularly, the write bubble 110 has a width that extends across the entirety of even track 102 and at least a portion of adjacent odd tracks 101 and 103. As illustrated, the write bubble 110 centered on even track 102 overlaps about 50% of the width of adjacent odd tracks 101 and 103. It is understood that the extent of this write bubble overlap can range between about 10% and 100% of an adjacent track.

Notably, the write bubble 110 centered on even track 102 and written to with MAMR frequency $f_1$ can extend over all or a portion of adjacent odd tracks 101 and 103 (written to with MAMR frequency $f_2$) without disrupting information written to odd tracks 101 and 103 because of the MAMR frequency selectivity. It is noted that the write bubble 110 can extend over adjacent tracks 101 and 103 when writing to track 102 at write-assist field frequency $f_1$ because of the inherent width of the write bubble, track misregistration or a combination of these two factors without risk of adjacent track overwrite because the adjacent tracks are only writeable when stimulated with write-assist energy at the other frequency, f2. Use of multiple MAMR frequencies according to embodiments of the disclosure provides a number of advantages, including larger write bubbles relative to track width, greater tolerance to TMR, reduction in write filed curvature on the track of interest, and allowing for directly-mapped, write-in-place operation as opposed to shingling.

In the lower portion of FIG. 1, a write bubble 110 is shown centered along odd track 105. The write bubble 110 centered on odd track 105 extends beyond width of track 105 in a cross-track direction. More particularly, the write bubble 110 has a width that extends across the entirety of odd track 105 and at least a portion of adjacent even tracks 104 and 106. As illustrated, the write bubble 110 centered on odd track 105 overlaps about 50% of the width of adjacent even tracks 104 and 106, it being understood that the extent of this write bubble overlap can range between about 10% and about 100% of an adjacent track. As in the case of writing to even tracks, the write bubble 110 centered on odd track 105 can extend over all or a portion of adjacent even tracks 104 and 106 without disrupting data written to even tracks 104 and 106 because of the MAMR frequency selectivity.

Figure 2:
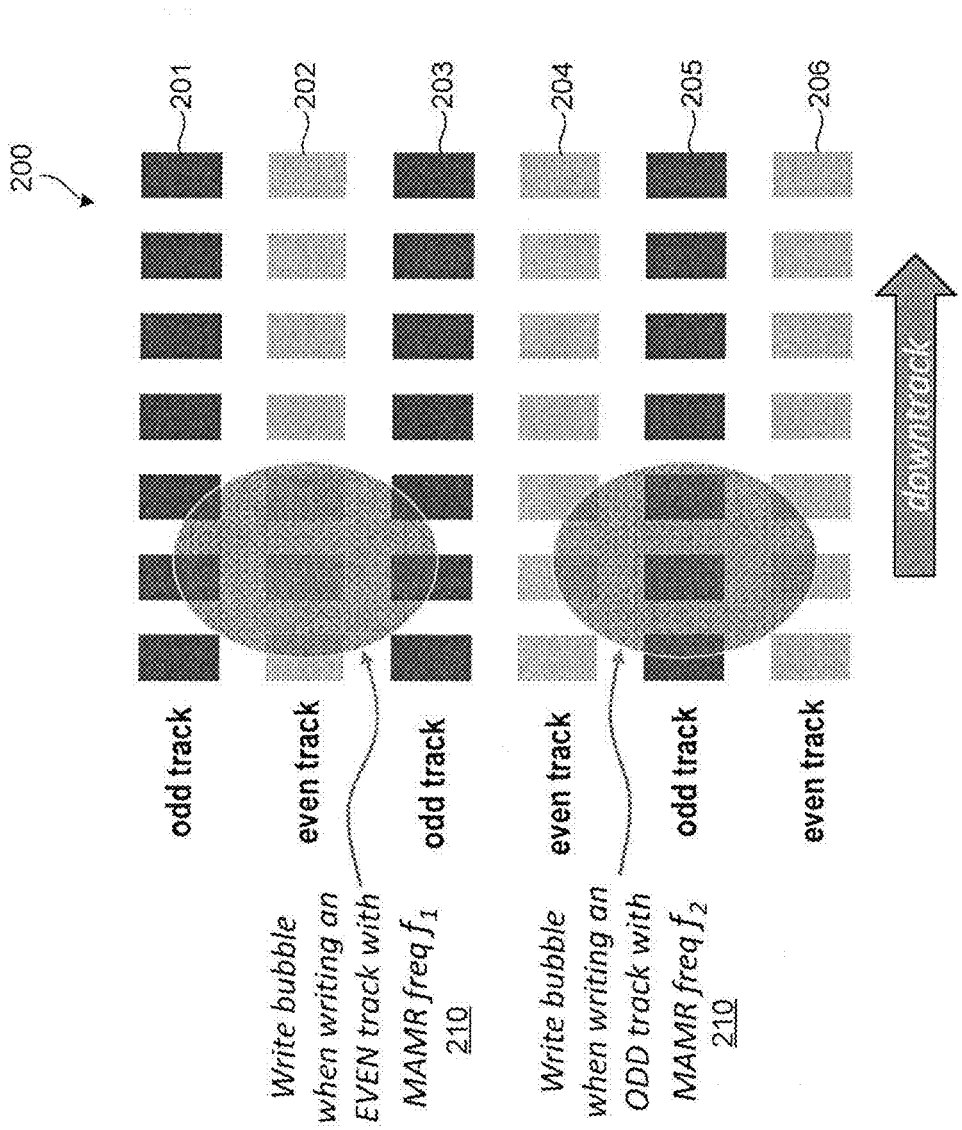
FIG. 2 illustrates tracks of a bit patterned magnetic recording medium that are formed from magnetic material having a plurality of different ferromagnetic resonant frequencies in accordance with various embodiments.

FIG. 2 illustrates tracks 200 of a bit patterned magnetic recording medium that are formed from magnetic material having a plurality of different ferromagnetic resonant frequencies in accordance with various embodiments. In the embodiment shown in FIG. 2, the medium is arranged as a bit patterned medium, which provides patterns of magnetic regions (e.g., "dots", "islands" or "blocks") within non-magnetic material (e.g., "troughs"). In bit patterned media, the magnetic material on a disk is patterned into small isolated islands such that there is a single magnetic domain in each island or "bit". The single magnetic domains can be a single grain or a few strongly coupled grains that switch magnetic states in concert as a single magnetic volume. To produce the required magnetic isolation of the patterned islands, the regions between the islands (e.g., troughs) are essentially nonmagnetic.

The upper portion of FIG. 2 illustrates microwave-assisted magnetic recording of even tracks of a bit patterned medium comprising tracks having alternating MAMR resonant frequencies, $f_1$ and $f_2$. The lower portion of FIG. 2 illustrates microwave-assisted magnetic recording of odd tracks of the bit patterned medium comprising tracks having alternating MAMR resonant frequencies, $f_1$ and $f_2$. In the upper portion of FIG. 2, a write bubble 210 is shown centered along even track 202. As can be seen in FIG. 2, the write bubble 210 centered on even track 202 extends beyond the width of track 202 in a cross-track direction, such that the write bubble 210 has a width that extends across the entirety of even track 202 and at least a portion of adjacent odd tracks 201 and 203. As shown in FIG. 2, the write bubble 210 centered on even track 202 overlaps about 50% of the width of adjacent odd tracks 201 and 203, it being understood that the extent of this write bubble overlap can range between about 10% and about 100% of an adjacent track. As in the case of a medium comprising discrete tracks (e.g., FIG. 1), the write bubble 210 centered on even track 202 can extend over all or a portion of adjacent odd tracks 201 and 203 without disrupting data written to odd tracks 201 and 203 because of the MAMR frequency selectivity.

In the lower portion of FIG. 2, a write bubble 210 is shown centered along odd track 205. The write bubble 210 centered on odd track 205 extends beyond width of track 205 in a cross-track direction, such that the width of the write bubble 210 extends across the entirety of odd track 205 and at least a portion of adjacent even tracks 204 and 206. As shown, the write bubble 210 centered on odd track 205 overlaps about 50% of the width of adjacent even tracks 204 and 206, it being understood that the extent of this write bubble overlap can range between about 10% and about 100% of an adjacent track. As in the case of writing to even tracks, the write bubble 210 centered on odd track 205 can extend over all or a portion of adjacent even tracks 204 and 206 without disrupting data written to even tracks 204 and 206 because of the MAMR frequency selectivity.

Figure 3:
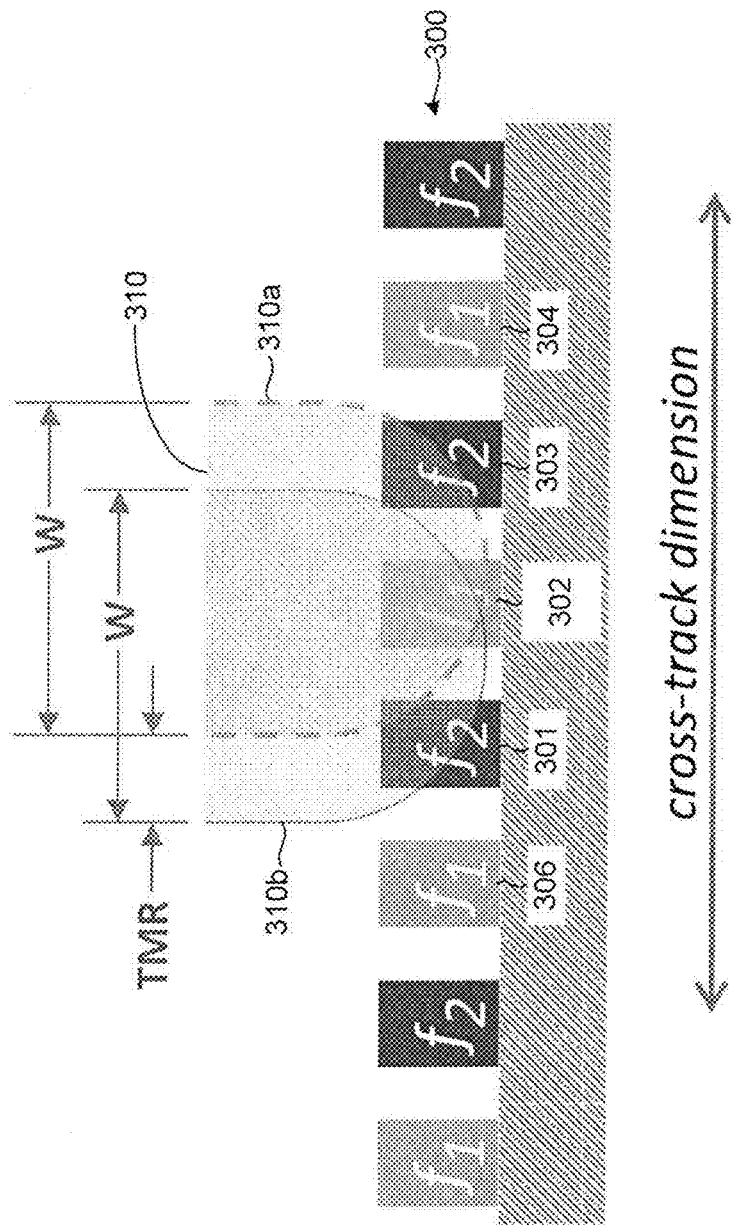
FIG. 3 is a view of a magnetic recording medium looking in the plane of the medium across eight discrete tracks, wherein adjacent tracks have different ferromagnetic resonant frequencies according to various embodiments.

FIG. 3 is a view of a magnetic recording medium looking in the plane of the medium across eight discrete tracks 300 according to various embodiments. In the representative embodiment illustrated in FIG. 3, alternating tracks 300 of the medium have different ferromagnetic resonant frequencies (e.g., frequencies $f_1$ and $f_2$). For example, the even tracks (e.g., tracks 302, 304, 306) of the medium comprise magnetic material having a first ferromagnetic resonant frequency $f_1$, while the odd tracks (e.g., tracks 301, 303) comprise magnetic material having a second ferromagnetic resonant frequency $f_2$. When writing to the even tracks, for example, a writer generates a write-assist field having a frequency at or about $f_1$. When writing to the odd tracks, the writer generates a write-assist field having a frequency at or about $f_2$. The first and second ferromagnetic resonant frequencies $f_1$ and $f_2$ are sufficiently separated such that writing to tracks adjacent a selected track does not overwrite the adjacent tracks due to the MAMR frequency selectivity.

FIG. 3 show the use of a write bubble 310 of width W which is wider than a single track (e.g., track 302) at two extremes of TMR. In FIG. 3, the write bubble 310 is shown to have a width W as wide as or wider than the combined width of two tracks. As shown, the track to be written is identified as track 302 having a ferromagnetic resonant frequency $f_1$. Adjacent tracks 301 and 302 are shown as having a ferromagnetic resonant frequency $f_2$. FIG. 3 shows the write bubble 310 positioned at the two TMR extremes at positions 310a (biased toward track 303) and 310b (biased toward track 301). It can be seen in FIG. 3 that the combined width of the write bubble 310 and its cross-track position variation (TMR) (i.e. W+TMR) can extend over 3 successive tracks (e.g., tracks 301, 302, and 303), since the adjacent tracks 301 and 303 with ferromagnetic resonant frequency $f_2$ are unaffected by the writing of the targeted track 302 (with ferromagnetic resonant frequency $f_1$).

With more complex patterning, the range of unambiguous resonant frequency selection can be extended over an even larger number of tracks by fabricating tracks with more than two resonant frequencies. FIG. 4 is a view of a magnetic recording medium looking in the plane of the medium across ten discrete tracks 400 according to various embodiments. In the representative embodiment illustrated in FIG. 4, successive tracks 401-410 of the medium have different ferromagnetic resonant frequencies (e.g., frequencies $f_1, f_2, \ldots f_n$). More particularly, each of the successive tracks 401-410 has a different one of a plurality of disparate ferromagnetic resonant frequencies. For example, the medium shown in FIG. 4 can be fabricated to include repeating sets of three successive tracks each having a different ferromagnetic resonant frequency ($f_1$, $f_2$ or $f_3$). As shown, the tracks 400 are arranged to include 3 sets (Sets 1-3) of tracks, wherein the tracks of each set have a different ferromagnetic resonant frequency. For example, Set-1 includes tracks 402, 403, and 404 each having a different ferromagnetic resonant frequency $f_1$, $f_2$, and $f_3$. Set-2 includes tracks 405, 406, and 407 each having a different ferromagnetic resonant frequency $f_1$, $f_2$, and $f_3$. Set-3 includes tracks 408, 409, and 410 each having a different ferromagnetic resonant frequency $f_1$, $f_2$, and $f_3$.

When writing to the first track of each set, a writer generates a write-assist field having a frequency at or about $f_1$. When writing to the second track of each set, the writer generates a write-assist field having a frequency at or about $f_2$. When writing to the third track of each set, the writer generates a write-assist field having a frequency at or about $f_3$. The first, second, and third ferromagnetic resonant frequencies $f_1$, $f_2$, $f_3$ are sufficiently separated such that writing to tracks adjacent a selected track does not overwrite the adjacent tracks due to the MAMR frequency selectivity.

FIG. 4 show the use of a write bubble 410 of width W which is wider than a single track (e.g., track 406) at two extremes of TMR. In FIG. 4, the write bubble 410 is shown to have a width W as wide as or wider than the combined width of three tracks. As shown, the track to be written is identified as track 406 having a ferromagnetic resonant frequency $f_2$. Adjacent tracks 405 and 407 are shown as having a ferromagnetic resonant frequency $f_1$ and $f_3$, respectively. Track 404 is adjacent track 405 and has a ferromagnetic resonant frequency $f_3$. Track 408 is adjacent track 407 and has a ferromagnetic resonant frequency $f_1$. Because consecutive tracks 400 have the sequence of resonant frequencies $f_1$, $f_2$, $f_3$, $f_1$, $f_2$, $f_3$, . . . , the combined write bubble 410 and cross-track position variation (TMR) (i.e., W+TMR) can extend over 5 tracks (i.e. 2 adjacent tracks in either direction of the targeted track) without risk of adjacent track overwrite. In general, the boundaries of a write bubble can extend over a width of 2f−1 tracks without causing adjacent track overwrite, where f is the number of interleaved ferromagnetic resonant frequencies.

FIG. 5 is graph showing the write current required to effectuate writing to magnetic media having two different ferromagnetic resonant frequencies in accordance with various embodiments. The x-axis of the graph represents microwave assist-field frequency, and the y-axis represents write current amplitude. Curve 501 represents the write current required to write to media having a ferromagnetic resonant frequency of $f_1$. Curve 502 represents the write current required to write to media having a ferromagnetic resonant frequency of $f_2$. The media having ferromagnetic resonant frequencies $f_1$ and $f_2$ can constitute adjacent tracks (discrete or bit patterned) of a magnetic recording disk, for example. Curves 501 and 502 show that the write current must be set to a point requiring microwave excitation at a frequency matching or nearly matching the resonance frequency of the media, but not so high that writing to $f_1$ media results in inadvertent writing to $f_2$ media (and vice versa).

FIG. 5 shows a sweet spot setting ("just right") for the write current when writing the $f_1$ and $f_2$ media that ensures that only the selected media is written. This sweet spot is shown as a range of frequencies centered around $f_1$ and $f_2$ near the inflection point of curves 501 and 502. It can be seen that the required write current amplitude needed to write to a particular media is at a minimum when the microwave assist field frequency matches the ferromagnetic resonant frequency of the media. It can also be seen that selective writing to the media ($f_1$ media but not $f_2$ media, or $f_2$ media but not $f_1$ media) is ensured within a range of frequencies about the ferromagnetic resonant frequency of the media, as long as the write current falls between the "just right" and "too high" amplitudes. When the write current exceeds the "too high" setting while writing to a selected media (e.g., $f_1$ media), it is possible that the non-selected media (e.g., $f_2$ media) is inadvertently written to at the same time as the selected media.

According to various embodiments, the ferromagnetic resonant frequency of a particular track (discrete or bit patterned) of a magnetic recording medium can range between about 10 GHz and 40 GHz, such as between 20 GHz and 30 GHz.

FIG. 6A-6F illustrate various processes for fabricating a magnetic recording media having tracks comprising a plurality of different ferromagnetic resonant frequencies in accordance with various embodiments. FIGS. 6A-6F show the cross-track patterning features of the media. If this patterning is only done in the cross-track dimension, the media is a dual-frequency version of discrete track recording media. If downtrack features are added to separate tracks into individual bit islands, the result is a dual-frequency version of bit patterned media.

Figure 6A:
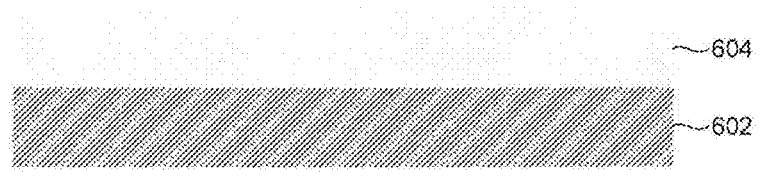
FIGS. 6A-6F illustrate various processes for fabricating a magnetic recording media having tracks comprising a plurality of different ferromagnetic resonant frequencies in accordance with various embodiments.
Figure 6B:
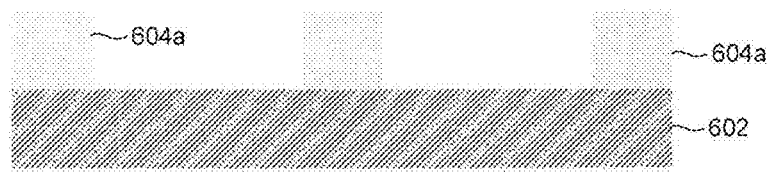
Figure 6C:
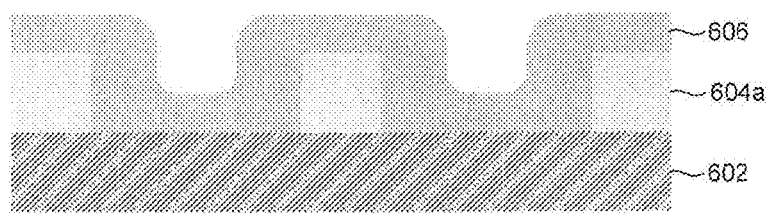

FIG. 6A shows forming a first recording layer 604 having a ferromagnetic resonant frequency $f_1$ on one or more underlayers and a substrate 602 of the media. FIG. 6B shows use of existing DSA (directed self-assembly) techniques on the first recording layer 604 to etch a pattern of discrete tracks 604a. Each of the tracks 604a is thus formed from magnetic material having a first ferromagnetic resonant frequency $f_1$. As is shown in FIG. 6C, an oxide layer 606 is deposited over the structure shown in FIG. 6B, such as by atomic layer deposition. The oxide layer 606 is directionally etched to leave only the sidewalls 606a, as is shown in FIG. 6D.

Figure 6D:
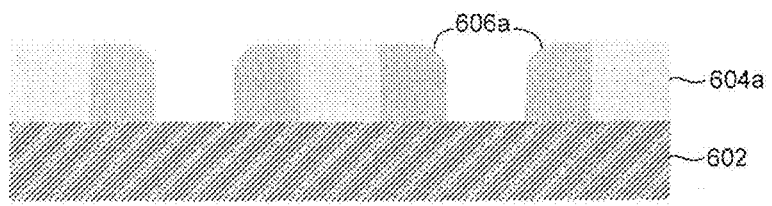
Figure 6E:
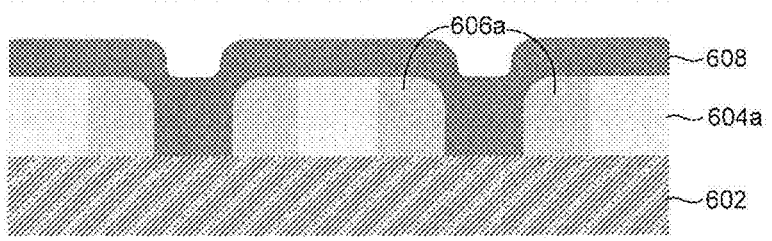
Figure 6F:
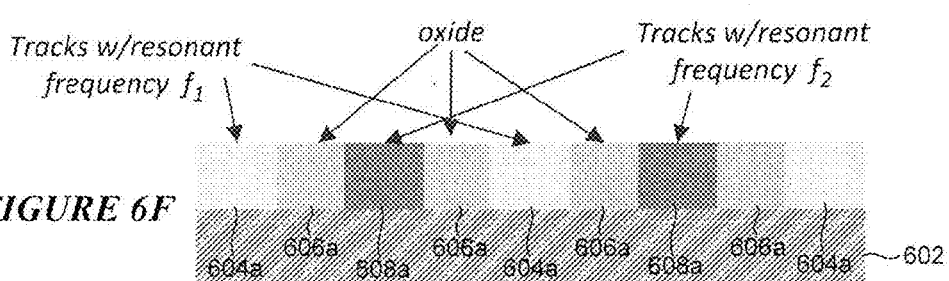

As is shown in FIG. 6E, one or more sublayers are deposited over the structure shown in FIG. 6D to form a second magnetic recording layer 608 having a second ferromagnetic resonant frequency $f_2$. The second magnetic recording layer 608 is directionally etched down to the pattern shown in FIG. 6F. Each of the tracks 608a is thus formed from magnetic material having a second ferromagnetic resonant frequency $f_2$. The pattern shown in FIG. 6F includes discrete tracks 604a and 608a alternating between resonant frequencies $f_1$ and $f_2$, planarized by the oxide 606a between the tracks 604a and 608a.

FIG. 7A shows a recording head arrangement configured to generate a high frequency write-assist field having a plurality of different frequencies in accordance with various embodiments. The recording head arrangement 700 includes a writer 730 and a reader 720 proximate an air bearing surface (ABS) 701 for respectively writing and reading data to/from a magnetic recording medium. The writer 730 includes a write pole 732 coupled to a return pole 731 and, in accordance with some embodiments, an axillary return pole 734. Although not shown in FIG. 7, the auxiliary return pole 734 is coupled to the write pole 732 by way of a magnetic via. The writer 730 is shown positioned proximate a write coil arrangement 708. In the embodiment shown in FIG. 7, the write coil arrangement 708 includes an upper coil 712 and a lower coil 710 (e.g., double-layer pancake coil design). In other embodiments, a single coil or helical coil design can be used instead of a double-layer pancake coil design. The reader 720 comprises a reader element 726 disposed between a pair of reader shields 722 and 724.

The recording head arrangement also includes a write-assist arrangement 740 positioned proximate the write pole 732. For example, the write-assist arrangement 740 can be positioned in the gap between the write pole 732 and the return pole 731, and is preferably situated adjacent the write pole 732. The write-assist arrangement 740 is configured to generate an RF assist magnetic field at a plurality of different frequencies. For example, the write-assist arrangement 740 can be configured to generate a first write-assist field (WAF-$f_1$) having a first frequency $f_1$ corresponding to the ferromagnetic resonant frequency of even tracks (discrete or bit patterned) of a magnetic recording medium (see, e.g., FIGS. 1 and 2). The write-assist arrangement 740 can be configured to generate a second write-assist field (WAF-$f_2$) having a second frequency $f_2$ corresponding to the ferromagnetic resonant frequency of odd tracks of the magnetic recording medium (see, e.g., FIGS. 1 and 2). It is understood that the write-assist arrangement 740 can be configured to generate write-assist fields at more than two frequencies (e.g., n>2 frequencies, where n=the number of distinct ferromagnetic resonant frequencies of the media).

As was previously discussed with reference to FIGS. 3 and 4, the write pole 732 can be configured to extend across multiple tracks without risk of overwriting tracks adjacent to the track currently being written. In general, the write pole 732 can be configured to generate a write field having a cross-track width that extends over 2N−1 tracks, where N is the number of successive tracks having a different ferromagnetic resonant frequency. For example, if a magnetic recording medium is fabricated to include tracks with two different and alternating ferromagnetic resonant frequencies (i.e. N=2), the write pole 732 can be configured to generate a write filed having a cross-track width that extend over 3 successive tracks. For a magnetic recording medium fabricated to include tracks with three different and alternating ferromagnetic resonant frequencies (i.e. N=3), the write pole 732 can be configured to generate a write filed having a cross-track width that extend over 5 successive tracks. If a magnetic recording medium is fabricated to include tracks with four different and alternating ferromagnetic resonant frequencies (i.e. N=4), the write pole 732 can be configured to generate a write filed having a cross-track width that extend over 7 successive tracks.

FIG. 7B shows a write-assist arrangement 740 configured to generate write-assist magnetic fields having a plurality of different frequencies in accordance with some embodiments. The write-assist arrangement 740 shown in FIG. 7B includes a first STO 744 configured to generate a first write-assist field having a first frequency $f_1$ (WAF-$f_1$). The write-assist arrangement 740 also includes a second STO 746 configured to generate a second write-assist field having a second frequency $f_2$ (WAF-$f_2$). When writing to tracks having a first ferromagnetic resonant frequency $f_1$, the first STO 744 is energized by input of a drive current, $I_i$, at the appropriate time (e.g., preceding or concurrently with the write current). When writing to tracks having a second ferromagnetic resonant frequency $f_2$, the second STO 746 is energized by input of a drive current, $I_i$, at the appropriate time (e.g., preceding or concurrently with the write current).

FIG. 7C shows a write-assist arrangement 740 configured to generate write-assist magnetic fields having a plurality of different frequencies in accordance with some embodiments. The write-assist arrangement 740 shown in FIG. 7C includes a single STO 748 configured to generate write-assist magnetic fields having a plurality of different frequencies. As illustrated, the STO 748 includes an input that can be switchably coupled to a first current source that supplies a first drive current, $I_1$, and a second current source that supplies a second drive current, $I_2$. In response to receiving the first drive current, $I_1$, the STO 748 generates a write-assist field having a first frequency $f_1$ (WAF-$f_1$) corresponding to the first ferromagnetic resonant frequency $f_1$. In response to receiving the second drive current, $I_2$, the STO 748 generates a write-assist field having a second frequency $f_2$ (WAF-$f_2$) corresponding to the second ferromagnetic resonant frequency $f_2$.

The STO 748 is configured to produce an oscillation frequency that varies in response to a varying input current. At a relatively low input current amplitude, the oscillation frequency of the STO 748 is relatively low (e.g., $f_1$). At a relatively high input current amplitude, the oscillation frequency of the STO 748 is relatively high (e.g., $f_2$). As such, the write-assist magnetic field generated by the STO 748 can be tuned by adjusting the amplitude of the drive current, $I_1$ and $I_2$.

FIG. 8 illustrates various processes for generating write-assisted magnetic fields having a plurality of different frequencies in accordance with various embodiments. The method of FIG. 8 can be implemented by the apparatuses shown in FIGS. 7A-7C, for example. The method shown in FIG. 8 involves moving 802 a magnetic recording medium relative to the recording head configured for MAMR. The method also involves writing 804 a first track using an assist magnetic field having a first frequency. The method typically involves encroaching 806 a second track adjacent the first track without disrupting recording in the second track. The method also involves writing 808 the second track adjacent the first track using an assist magnetic field having a second frequency. The method typically involves encroaching 810 the first track without disrupting data recorded in the first track. The method continues 812 by writing other tracks alternately using assist magnetic fields having the first and second frequencies.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. An apparatus, comprising:
    a recording transducer configured for microwave-assisted magnetic recording (MAMR), comprising:
        a write pole configured to generate a write magnetic field; and
        a write-assist arrangement proximate the write pole and configured to generate a radio frequency assist magnetic field at a plurality of different frequencies; and
    a magnetic recording medium comprising a plurality of tracks, wherein adjacent tracks of the medium have different ferromagnetic resonant frequencies.

2. The apparatus of claim 1, wherein the write-assist arrangement comprises a single spin torque oscillator configured to selectively generate the assist magnetic field at each of the plurality of different frequencies.

3. The apparatus of claim 1, wherein the write-assist arrangement comprises a plurality of spin torque oscillators each configured to generate the assist magnetic field at one of the plurality of different frequencies.

4. The apparatus of claim 1, wherein:
- the medium comprises a plurality of successive tracks each having a different ferromagnetic resonant frequency; and
- the write pole is configured to generate a write field having a cross-track width that extends across at least a portion of the plurality of the successive tracks.

5. The apparatus of claim 1, wherein the write pole is configured to generate a write field having a cross-track width that extends over 2N−1 tracks, where N is a number of successive tracks.

6. The apparatus of claim 1, wherein the write-assist arrangement is configured to generate the assist magnetic field at two different frequencies.

7. The apparatus of claim 1, wherein the write-assist arrangement is configured to generate the assist magnetic field at more than two different frequencies.

8. The apparatus of claim 1, wherein the plurality of tracks comprise discrete tracks.

9. The apparatus of claim 1, wherein the plurality of tracks comprise bit patterned tracks.

10. An apparatus, comprising:
- a recording transducer configured for microwave-assisted magnetic recording (MAMR), comprising:
  - a write pole configured to generate a write magnetic field; and
  - a write-assist arrangement proximate the write pole and configured to generate a radio frequency assist magnetic field at a plurality of different frequencies, the plurality of different frequencies corresponding to different ferromagnetic resonant frequencies of different tracks of a magnetic recording medium.

11. The apparatus of claim 10, wherein the write-assist arrangement comprises a single spin torque oscillator configured to selectively generate the assist magnetic field at each of the plurality of different frequencies.

12. The apparatus of claim 10, wherein the write-assist arrangement comprises a plurality of spin torque oscillators each configured to generate the assist magnetic field at one of the plurality of different frequencies.

13. The apparatus of claim 10, wherein the write-assist arrangement is configured to generate the assist magnetic field at two different frequencies.

14. The apparatus of claim 10, wherein the write-assist arrangement is configured to generate the assist magnetic field at more than two different frequencies.

15. The apparatus of claim 10, wherein the write pole is configured to generate a write field having a cross-track width that extends over 2N−1 tracks, where N is a number of successive tracks of a magnetic recording medium.

16. An apparatus, comprising:
- a magnetic recording medium configured for microwave-assisted magnetic recording (MAMR) and comprising a plurality of tracks;
- wherein adjacent tracks of the medium have differing ferromagnetic resonant frequencies.

17. The apparatus of claim 16, wherein the plurality of tracks comprise discrete tracks.

18. The apparatus of claim 16, wherein the plurality of tracks comprise bit patterned tracks.

19. The apparatus of claim 16, wherein each track comprises magnetic material having one of two different ferromagnetic resonant frequencies.

20. The apparatus of claim 16, wherein each track comprises magnetic material having one of three or more different ferromagnetic resonant frequencies.

21. A method, comprising:
- moving a recording transducer configured for microwave-assisted magnetic recording (MAMR) relative to a magnetic recording medium comprising a plurality of tracks, wherein adjacent tracks of the medium have differing ferromagnetic resonant frequencies;
- generating a radio frequency write-assist field having one of a plurality of different frequencies;
- selecting a particular frequency that corresponds to a ferromagnetic resonant frequency of a particular track of the medium; and
- generating a write field to write information to the particular track assisted by the write-assist field.

22. The method of claim 21, wherein:
- writing a first track having a first ferromagnetic resonant frequency comprises encroaching into a second track adjacent the first track without disrupting information written to the second track; and
- writing a second track having a second ferromagnetic resonant frequency comprises encroaching into the first track without disrupting information written to the first track.

* * * * *